(No Model.)
N. L. FOX.
Carriage Top Joint.
No. 229,312. Patented June 29, 1880.
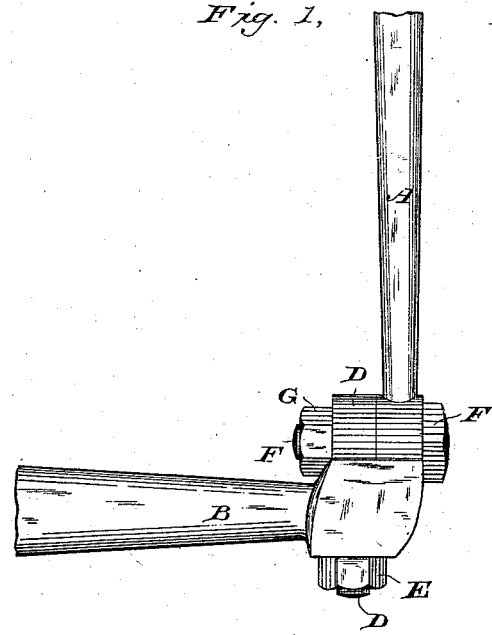
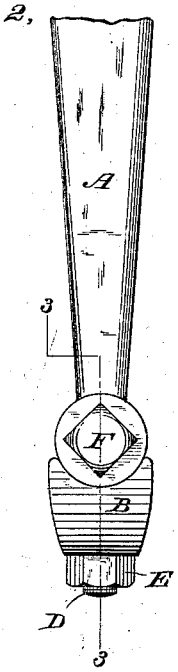
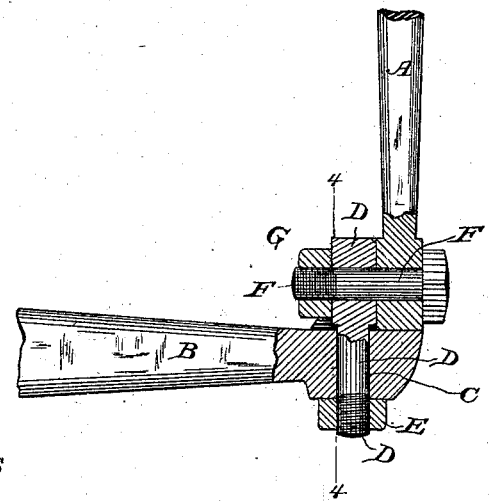
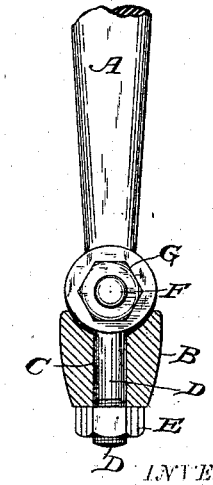
WITNESSES
Wm A. Skinkle
Chas. H. Baker
INVENTOR
Norman L. Fox.
By his Attorneys
Baldwin, Hopkins & Peyton

UNITED STATES PATENT OFFICE.

NORMAN L. FOX, OF CEYLON, OHIO.

CARRIAGE-TOP JOINT.

SPECIFICATION forming part of Letters Patent No. 229,312, dated June 29, 1880.

Application filed May 3, 1880. (No model.)

*To all whom it may concern:*

Be it known that I, NORMAN L. FOX, of Ceylon, in the county of Erie and State of Ohio, have invented a new and useful Carriage-Top Joint, of which the following is a specification.

The object of my improvement is to prevent the joint from wearing loose so as to rattle by the motion of the carriage, and thus by rattling increase the wear. Accordingly I provide means for tightening up the joint, and in that way prevent much wear and overcome, in a considerable measure, the evil effects of such wear as is unavoidable.

In the accompanying drawings, which illustrate my invention, Figure 1 is a side elevation. Fig. 2 is an end elevation. Fig. 3 is an elevation, partly in section on line 3 3 of Fig. 2. Fig. 4 is an elevation, partly in section on line 4 4 of Fig. 3.

A indicates the lower end of the center or main bow of a carriage-top, to which the other bows are usually attached. B indicates the lateral arm or projection from the carriage-seat, which supports and forms the socket or bearing for the circular end of the bow A.

The bearing B is provided with a bolt-hole, C, fitting into which is a vertical bolt, D, screw-threaded at its lower end, and provided with a nut, E. The lower circular end of the bow A is hinged to the head of the bolt D by means of a pivot-bolt, F, which passes through them, and may be provided with a nut, G, to secure it in place. The head of the vertical bolt D is not circular like the lower end of the bow A, but is eccentric, being cut away upon its lower side, so that when the lower end of the bow A rests in its socket there will be a space left between the lower side of the bolt-head and the circular socket or bearing of the lateral projection B. The result is, that as use occasions wear of the socket or of the lower end of the main bow resting therein, or both, the nut E can be tightened, and thus the bow end and its bearing always be kept in contact, whereby rattling and unnecessary wear that would be occasioned by it are prevented. This method of construction prevents in a great measure wear upon the pivot-pin F, and confines the wear principally to the end of the bow and its bearing-socket, where it will be much slower and less perceptible than it usually is upon the pivot-pin. The head of the bolt D might be concentric and of less diameter than the end of the bow A.

I am aware that various means have been provided for compensating for or avoiding the evil effects of wear in joints and couplings; but I am not aware that my improvement in carriage-top joints, as herein specified, has ever before been employed.

What I claim as new, and desire to secure by Letters Patent, is—

The combination of the bow A, provided with a circular bearing end, the lateral projection B, provided with a circular socket, the vertically-adjustable headed bolt D, and pivot-pin F, constructed and operating substantially as described.

NORMAN L. FOX.

Witnesses:
P. S. SHOUPE,
G. J. PEAK, Jr.